United States Patent
Tsai et al.

(10) Patent No.: US 7,027,136 B2
(45) Date of Patent: Apr. 11, 2006

(54) STRUCTURE ANALYSIS AND DEFECT DETECTION SYSTEM

(75) Inventors: John C. Tsai, Saratoga, CA (US); David W. Wang, Saratoga, CA (US)

(73) Assignee: Fibera, Inc., Santa Clara, CA (US)

( * ) Notice: Subject to any disclaimer, the term of this patent is extended or adjusted under 35 U.S.C. 154(b) by 41 days.

(21) Appl. No.: 10/605,994

(22) Filed: Nov. 12, 2003

(65) Prior Publication Data

US 2004/0149897 A1 Aug. 5, 2004

Related U.S. Application Data

(60) Provisional application No. 60/425,882, filed on Nov. 12, 2002.

(51) Int. Cl.
*G01N 21/00* (2006.01)

(52) U.S. Cl. .................................... 356/73.1

(58) Field of Classification Search .............. 356/73.1, 356/450–460, 35.5; 250/227.13, 227.18, 250/227.23; 385/12, 14
See application file for complete search history.

(56) References Cited

U.S. PATENT DOCUMENTS 6,204,920 B1 * 3/2001 Ellerbrock et al. ......... 356/477

* cited by examiner

*Primary Examiner*—Tu T. Nguyen
(74) *Attorney, Agent, or Firm*—Raymond E. Roberts; Intellectual Property Law Offices

(57) ABSTRACT

A structure analysis and defect detection system in which a laser light source provides light via optical fiber to fiber Bragg gratings that change resonant frequency as stresses change in the structure. Light at the resonant frequencies of the fiber Bragg gratings is reflected and light of other frequencies is passed. The respective reflected light is directed through a Fabry-Perot interference filter or a fiber interferometer and detected by a photodetector. If the Fabry-Perot interference filter is used, the intensity of the reflected light indicates current stress at a fiber Bragg grating. If the fiber interferometer is used, a beat frequency due to heterodyne interference in the light indicates current stress at the respective fiber Bragg grating. Comparison data for the respective characteristic in the detected light over time permits stress analysis, and comparison of such data with pre-determined limit values permits defect or failure detection.

32 Claims, 5 Drawing Sheets

STRUCTURE ANALYSIS AND DEFECT DETECTION SYSTEM

CROSS REFERENCE TO RELATED APPLICATIONS

This application claims the benefit of U.S. Provisional Application No. 60/425,882, filed Nov. 12, 2002.

BACKGROUND OF INVENTION

1. Technical Field

The present invention relates generally to fiber optics based optical sensing, and more particularly to the use of such in analyzing stresses in structures and detecting defects there in.

2. Background Art

Fiber optics based optical sensing, signal processing, and components have a broad range of applications. Although probably best know in recent times for applications in communications and the boom in 1998–2001 in that industry, inventions applying fiber optics in other areas continue to be developed and can now particularly apply the infrastructure that the communications industry has provided. Many ideas that might have once seemed unduly academic to be put into practice can now be realized. As the present inventors have worked fiber communications systems, they have also adapted the underlying principles and crafted technology to use fiber optics for structure analysis and defect detection.

Structure defects have major significance for reliability and safety. Imagine if the fatigue of the craft used for China Airlines flight Cl 611 had been detected prior to take-off. The tragedy in which that craft broke apart in mid-air and 225 people perished might then have been averted. Modern "bullet" trains require track that must not shift appreciably, and in which even as little as one-millimeter of thermally induced expansion or contraction can be a serious safety concern. Ships and boats have similar concerns, as well as some additional ones. Submarines are subject to high pressures and strains, yet shipbuilders and failure analysis experts often have little more than engineering theory to guide them. But what to do in surface vessels after explosions, collisions, and battering in sever weather is not usually clear until an inspection can be completed, subjecting crew to risk and taking up precious time that may put the vessel in even further peril. If the two towers of World Trade Center had been equipped with a structure analysis system, the failure mode might have been recorded before the collapse and future so that architects and structural engineers could apply that data to design better buildings. Bridges and particularly dams are other examples of stationary structures where on-going structural analysis would produce immediate practical and long term academic benefits.

In sum, the need for better systems for defect detection and stress analysis in structures is enormous.

SUMMARY OF INVENTION

Accordingly, it is an object of the present invention to provide a detection system useful for structure analysis and defect detection.

Briefly, one preferred embodiment of the present invention is a system for analyzing the stresses in a structure that includes a laser module with a laser light source to produce a light beam, multiple sensor modules each including a fiber Bragg grating, and multiple modules paired with the sensor modules. Each filter module includes a filter device and a photodetector to produce a detector signal. A first set of optical fiber communicates portions of the light beam from the laser module to the sensor modules, and a second set of optical fiber communicates portions of the light beam from the sensor modules to respective filter modules. A monitoring station receives the detector signals and can then perform analysis thereon.

These and other objects and advantages of the present invention will become clear to those skilled in the art in view of the description of the best presently known mode of carrying out the invention and the industrial applicability of the preferred embodiment as described herein and as illustrated in the several figures of the drawings.

BRIEF DESCRIPTION OF DRAWINGS

The purposes and advantages of the present invention will be apparent from the following detailed description in conjunction with the appended figures of drawings in which.

In the various figures of the drawings, like references are used to denote like or similar elements or steps.

DETAILED DESCRIPTION

Figure 1:
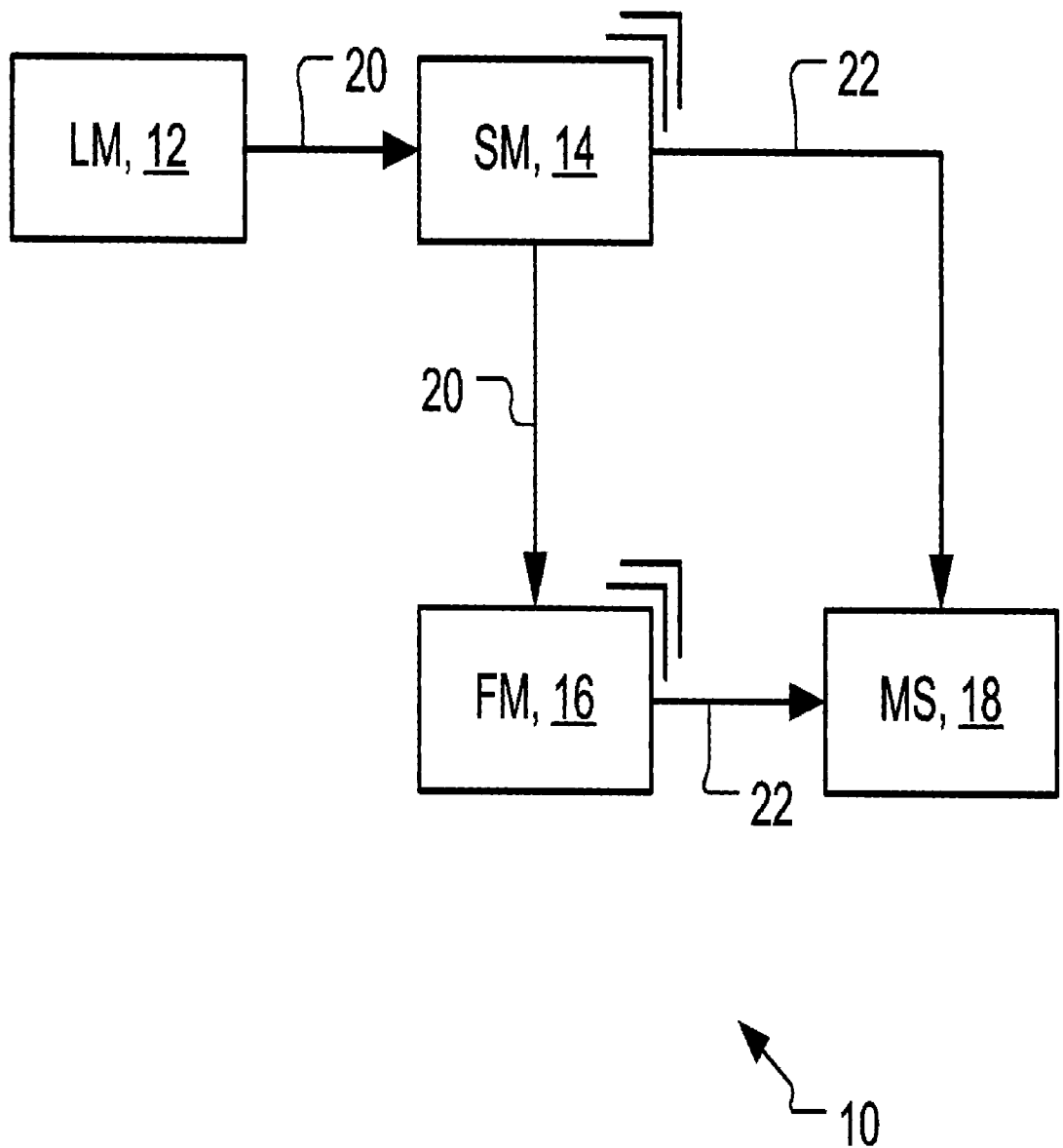
FIG. 1 is a block diagram depicting an overview of the major modules and their connections in the present invention.

A preferred embodiment of the present invention is a structure analysis and defect detection system that particularly employs fiber optic components. As illustrated in the various drawings herein, and particularly in the view of FIG. 1, this preferred embodiment of the invention is depicted by the general reference character 10. The structure analysis and defect detection system 10, when built into a structure, will be able to detect changes in the structure and report the seriousness and locations of such changes. Such changes can include, without limitation, phenomena such as: shifting of a building, cracking in a building, twist or relative movement between two levels, thermal induced change, weakening of a bridge, railway track shift during a storm, safety monitoring of nuclear reactors, etc. All of these defects can be reported and analyzed by parties engaged in building or facility management, industry group standards setting, governmental regulation at local and higher levels, insurance underwriting, and academic statistical analysis.

FIG. 1 is a block diagram depicting an embodiment of a structure analysis and defect detection system 10 that consists of four major modules: a laser module 12 (LM), multiple sensor modules 14 (SM), multiple filter modules 16 (FM), and a monitoring station 18 (MS). The laser module 12, sensor modules 14, and filter modules 16 are connected with optical fiber 20, which is installed internally or attached to the surface of the structure. All four of the major modules 12, 14, 16, 18 are also typically connected with electrical wiring 22.

The laser module 12 consists of a laser source 24, a wavelength or frequency locker 26, and controlling and frequency stabilization electronics 28. The laser source 24 is a broadband unit that is frequency and intensity stabilized and produces a light beam 30. The frequencies of the light beam 30 are locked to one of the grids of the frequency locker 26 in conventional manner, with stability better than 1 GHz thus obtainable. The intensity of the light beam 30 is also stabilized, to control the signal-to-noise ratios of detected signals based on it.

The light beam 30 is distributed into an ensemble of branches of the optical fiber 20. Each branch can be subdivided into more sub-branches either in daisy chain (serial) or in parallel configurations. See e.g., FIGS. 2 and 3. If a parallel configuration is used, a demultiplexer 31 is provide and used as shown.

Figure 2:
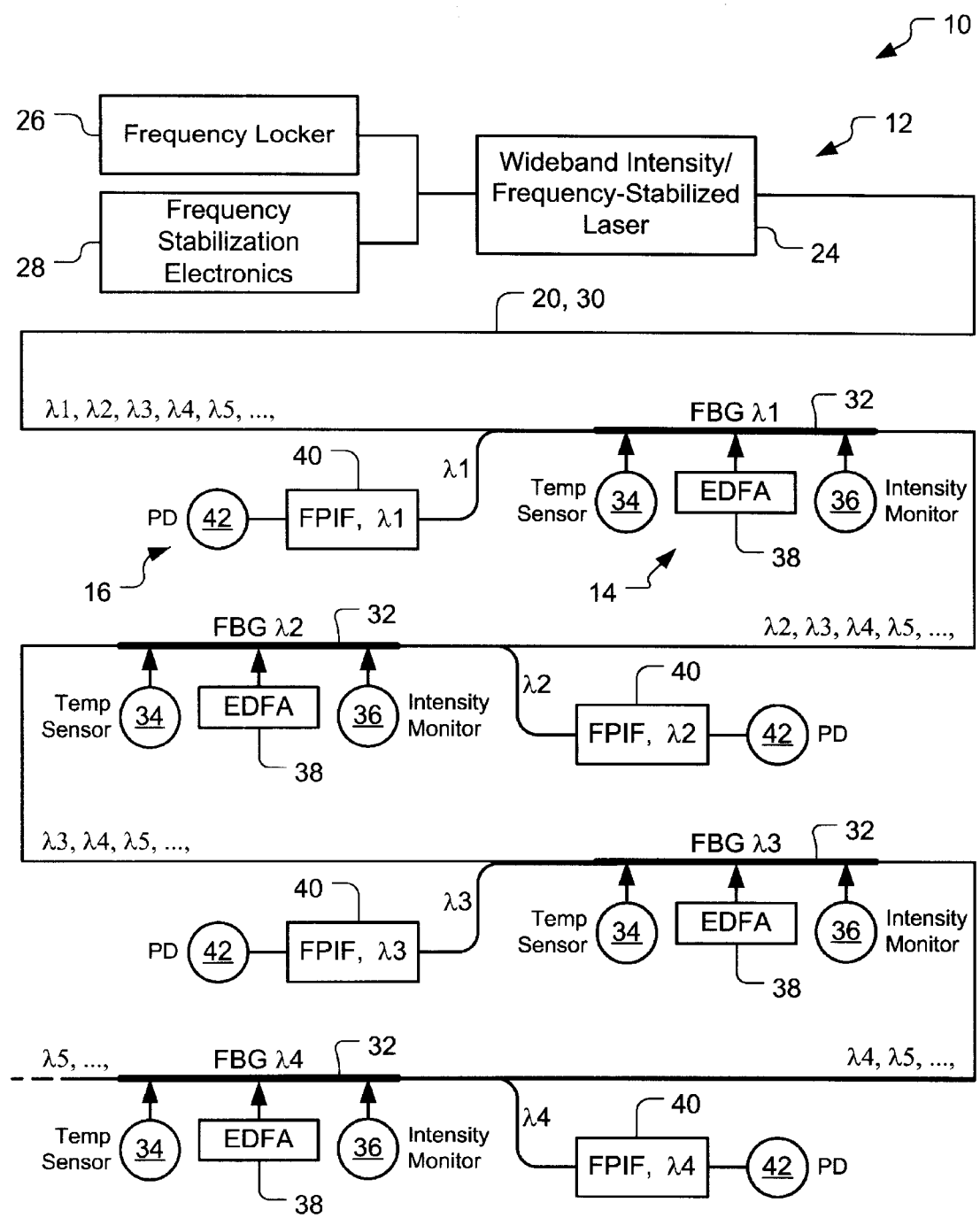
FIG. 2 is a schematic block diagram depicting a "daisy chain" (serial) configuration of the present invention applied as a structure defect detection system.
Figure 3:
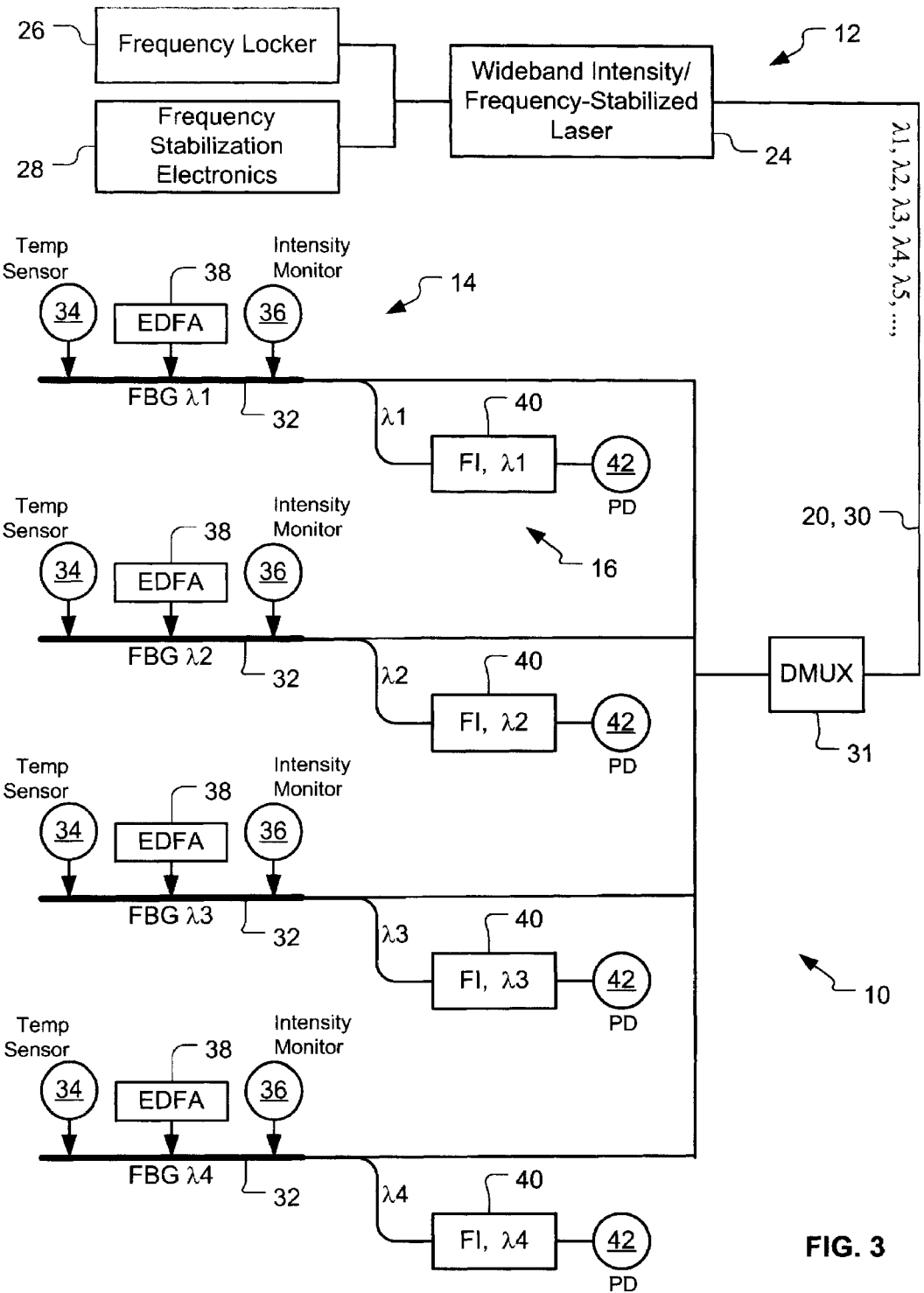
FIG. 3 is a schematic block diagram depicting a parallel configuration of the present invention also applied as a structure defect detection system.

Turning now also to FIGS. 2 and 3, the sensor modules 14 each consist of a fiber Bragg grating 32 (FBG), a temperature sensor 34, an intensity monitor 36, and an, optional, erbium doped fiber amplifier 38 (EDFA).

The sensor modules 14 detect defects or changes at respective locations. When a fiber Bragg grating 32 encounters stress or strain in the structure, its pitch is stretched and its resonance frequency changes accordingly. This effects the light beam 30 in the optical fiber 20 by shifting a frequency there. That frequency shift is then detected, by the respective filter module 16, and determination and analysis of the structure deformation is carried out at the monitoring station 18.

Processing in the filter modules 16 can be conducted in either intensity mode or frequency mode. For intensity mode, a Fabry-Perot interference filter (FPIF) can be used, preferably one with multichannel capability matching the multichannel grid of the frequency locker 26. For frequency mode, a fiber interferometer (FI) can be used. The daisy chain embodiment of the inventive structure analysis and defect detection system 10 in FIG. 2 uses Fabry-Perot interference filters and the parallel embodiment in FIG. 3 uses fiber interferometers, but those particular choices for these examples are arbitrary.

As shown in FIG. 2, the intensity mode type of filter modules 16 each consists of a Fabry-Perot interference filter 40 and a photodetector 42 (PD). The Fabry-Perot interference filter 40 is in resonance with the frequency locker 26 and preferably is athermal between −40° C. and 85° C. When the reflected frequency from the fiber Bragg grating 32 is injected into the Fabry-Perot interference filter 40, the signal remains unchanged from the beginning (i.e. the initial calibration during installation) if there is no distortion to the fiber Bragg grating 32, otherwise the signal will be different. A calibration look-up table for the relationship of structure distortion vs. intensity change can be established during installation and used through the lifetime of the structure. Due to its ease of operation and athermal property, use of the Fabry-Perot interference filter 40 in the structure analysis and defect detection system 10 provides several advantages, including lower cost and improved reliability.

The frequency mode type of filter modules 16 employ heterodyne principals and each consists of a fiber interferometer 44 and a photodetector 42. When the light beam 30 is reflected by the fiber Bragg grating 32, the resonant frequency is shifted due to the strain or pressure applied to the fiber Bragg grating 32. This reflected light is injected into the fiber interferometer 44 with light from the original light beam 30. The beat frequency between the original beam and the reflected beam then indicates the amount of strain or pressure that the fiber Bragg grating 32 is undergoing and is detected with the photodetector 42.

The monitoring station 18 is, typically, one centralized station. It receives signals from the temperature sensors 34 and intensity monitors 36, in the sensor modules 14, as well as signals from the photodetectors 42 in the filter modules 16. With the signals from the temperature sensors 34 and intensity monitors 36, the monitoring station 18 normalizes the signals from the photodetectors 42. The monitoring station 18 regularly reviews these results and compares them with a database of data for the respective locations of the sensor modules 14. The monitoring station 18 can then determine whether the structure is encountering any deformation. A warning signal can then be send out if a deformation exceeds a threshold limit, or the results can be recorded and analyzed for trends, etc.

Figure 4:
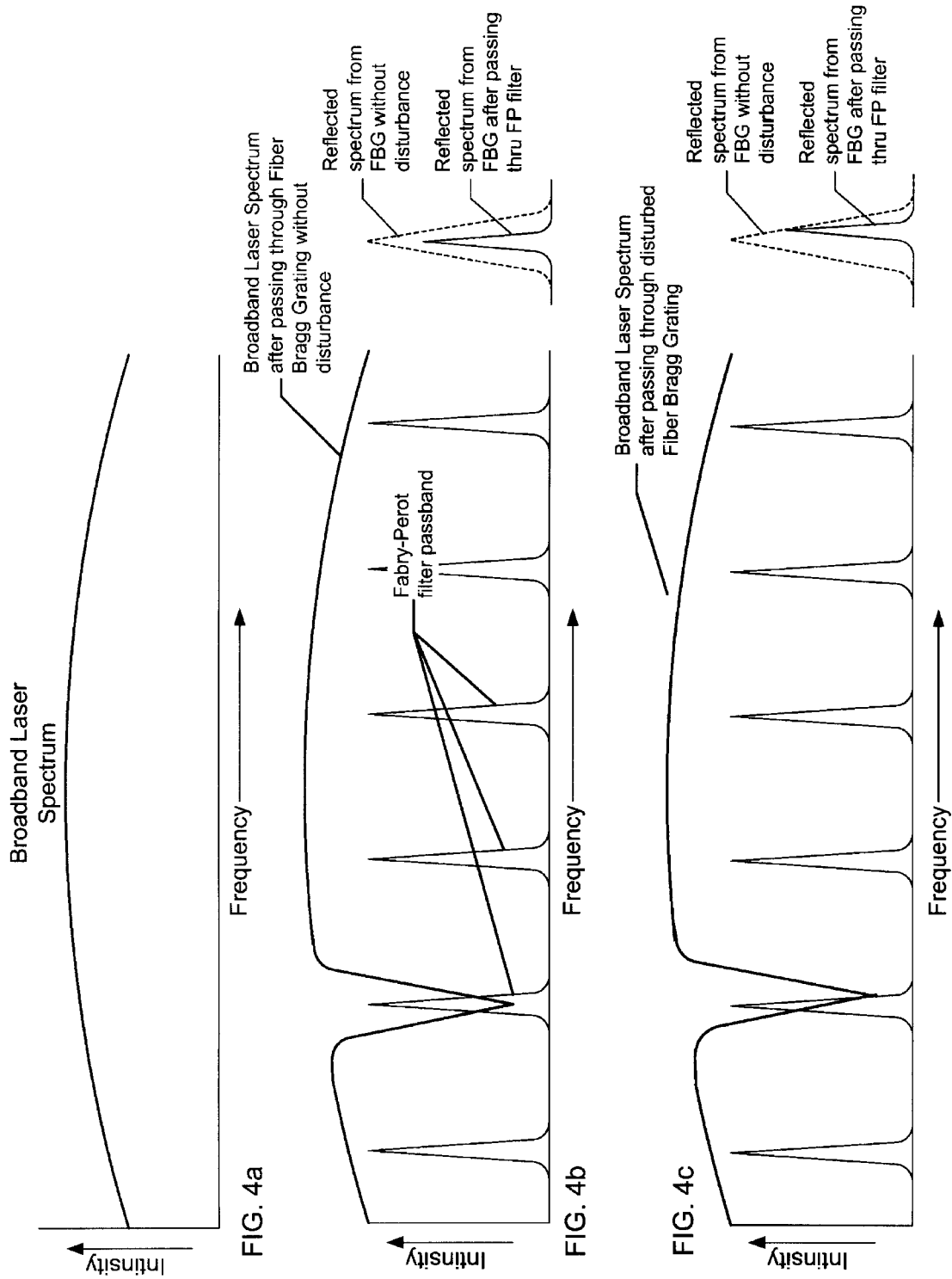
FIG. 4a–c are graphs showing how a reflected laser spectrum changes in bath intensity and frequency from a disturbed fiber Bragg grating.

FIG. 4a–b are graphs of the spectrum in the light beam 30, particularly depicting changes in both intensity and frequency from a disturbed fiber Bragg grating 32. FIG. 4a depicts the broadband spectrum of the unaltered light beam 30; FIG. 4b depicts the spectrum in the light beam 30 after the fiber Bragg grating 32, when there has been no disturbance; and FIG. 4c depicts the spectrum when there has been a disturbance. FIG. 4b–c further show the passbands of the Fabry-Perot interference filter 40. In FIG. 4b it can be seen that the reflected spectrum from the fiber Bragg grating 32 and the portion of it passed by the Fabry-Perot interference filter 40 have peaks frequencies that coincide when there has been no disturbance. In contrast, FIG. 4c shows how the reflected spectrum and the passed portion of it have peak frequencies that do not coincide when there has been a disturbance.

Figure 5:
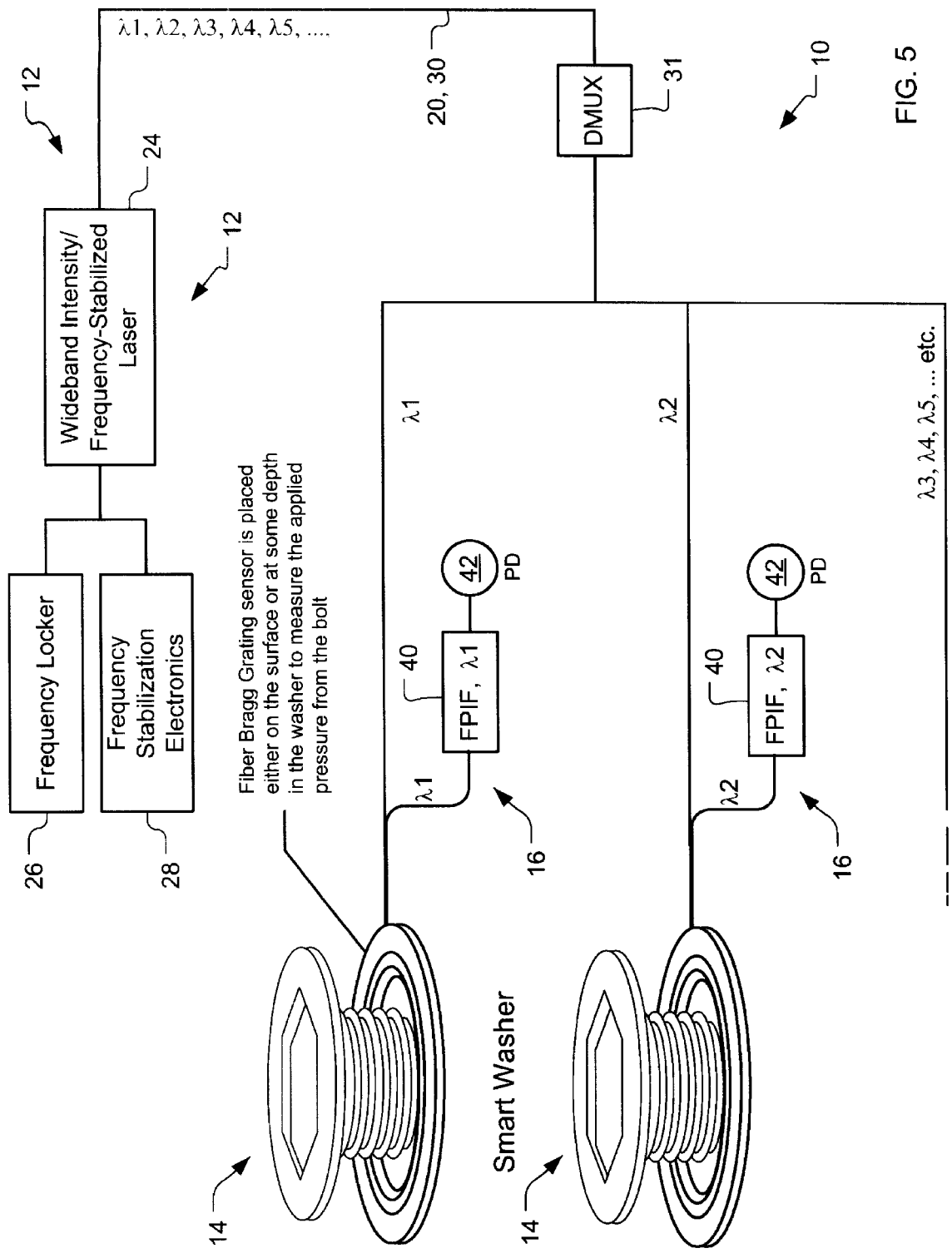
FIG. 5 is a block diagram schematically depicting portions of a sensor module of the present invention implemented in a "smart washer."

FIG. 5 is a block diagram schematically depicting portions of a sensor module of the present invention implemented in a "smart washer." Here the fiber Bragg grating 32 is placed at or in a washer that subject to stress or pressure applied by the structure, via a bolt head. Of course, other physical forms than the washer and bolt head scheme in FIG. 5 can be used. For instance, a washer and a rivet head or the nut on a threaded rod can be used. Alternately, the fiber Bragg grating 32 can be placed in a pad that rests between structural members. The possible variations here are probably limitless.

While various embodiments have been described above, it should be understood that they have been presented by way of example only, and not limitation. Thus, the breadth and scope of the invention should not be limited by any of the above described exemplary embodiments, but should be defined only in accordance with the following claims and their equivalents.

The invention claimed is:

1. A system for analyzing the stresses in a structure, comprising:
   a laser module including a laser light source to produce a wideband light beam;
   a plurality of sensor modules each including a single fiber Bragg grating;
   a plurality of filter modules paired with said sensor modules, wherein each said filter module includes a fixed-frequency filter device and a photodetector to produce a heterodyne beat-based or an intensity-based detector signal;
   a first set of optical fiber to communicate portions of said light beam from said laser module to said plurality of sensor modules;

a second set of optical fiber to communicate portions of said light beam from said sensor modules to respective said filter modules; and a monitoring station to receive said detector signals and perform analysis thereon.

2. The system of claim 1, wherein said laser module additionally includes at least one member of the set consisting of frequency locking sub-systems and intensity stabilization sub-systems.

3. The system of claim 2, wherein said a said frequency locking sub-system is provided and includes multichannel capability across a dense free spectrum range.

4. The system of claim 2, wherein a said frequency locking sub-system is provided and said frequency locking sub-system and said filter devices have matching resonant frequencies.

5. The system of claim 1, wherein said sensor modules additionally include temperature sensors to produce temperature signals and said monitoring station is able to normalize said detector signals based on said temperature signals.

6. The system of claim 1, wherein said sensor modules additionally include intensity sensors to produce intensity signals and said monitoring station is able to normalize said detector signals based on said intensity signals.

7. The system of claim 1, wherein said sensor modules additionally include erbium doped fiber amplifiers.

8. The system of claim 1, wherein said fiber Bragg gratings are encompassed in a member of the set consisting of washers and pads subject to the stresses in the structure.

9. The system of claim 1, wherein said filter devices include Fabry-Perot interference filters, thereby having light intensity in said detector signal be representative of the stresses in the structure at the sensor modules.

10. The system of claim 1, wherein said filter devices include fiber interferometers, thereby having heterodyne interference in said detector signal be representative of the stresses in the structure at the sensor modules.

11. The system of claim 1, wherein said first set of optical fiber connects said plurality of sensor modules in a parallel configuration.

12. The system of claim 1, wherein:
said laser module produces a broadband said light beam; and
said fiber Bragg gratings have different said resonant frequencies.

13. The system of claim 12, wherein said first set of optical fiber connects said plurality of sensor modules in a serial configuration.

14. The system of claim 12, further comprising a demultiplexer and wherein said first set of optical fiber connects said plurality of sensor modules in a parallel configuration.

15. The system of claim 1, wherein said monitoring station is able to perform said analysis with respect to time.

16. The system of claim 1, wherein said monitoring station is able to compare said detector signals against a database of installation information for the structure.

17. The system of claim 1, wherein said monitoring station is able to communicate results and warnings based on said analysis of said detector signals.

18. A method of analyzing the stresses in a structure, the method comprising the steps of:
(a) providing wideband a light beam to a plurality of fiber Bragg gratings installed in the structure;
(b) reflecting a first portion of said light beam from each said fiber Bragg grating;

(c) passing said first portions through respective interference units as second portions of said light beam having fixed-frequency specific filtered light characteristics;

(d) detecting said filtered light characteristics in said second portions of said light beam based on heterodyne beats or intensity; and (e) comparing said filtered light characteristics against previously collected data for said filtered light characteristics, thereby permitting analysis of changes in the stresses in the structure.

19. The method of claim 18, further comprising locking frequencies in said light beam.

20. The method of claim 19, wherein said frequencies in said light beam are locked to match resonant frequencies of said interference units.

21. The method of claim 18, further comprising stabilizing intensity of said light beam.

22. The method of claim 18, further comprising detecting temperatures at said fiber Bragg gratings and normalizing said filtered light characteristics based thereon.

23. The method of claim 18, further comprising detecting reference light intensifies in said light beam at said fiber Bragg gratings and normalizing said filtered light characteristics based thereon.

24. The method of claim 18, wherein said interference units include Fabry-Perot interference filters, thereby having light intensities be said filtered light characteristics.

25. The method of claim 18, wherein said interference units include fiber interferometers, thereby having heterodyne interference be said filtered light characteristics.

26. The method of claim 18, wherein said fiber Bragg gratings have different resonant frequencies and said step (a) includes having said light beam include a plurality of different frequencies and serially providing said light beam to said plurality of fiber Bragg gratings.

27. The method of claim 18, wherein said step (a) includes providing said light beam to said plurality of fiber Bragg gratings in parallel.

28. The method of claim 18, wherein said fiber Bragg gratings have different resonant frequencies and said step (a) includes having said light beam include a plurality of different frequencies, demultiplexing said light beam into portions having said different frequencies, and providing said portions to said plurality of fiber Bragg gratings in parallel.

29. The method of claim 18, wherein said step (e) includes comparing a plurality of said filtered light characteristics collected from different said fiber Bragg gratings with respect to time.

30. The method of claim 18, wherein said step (e) includes storing said plurality of said filtered light characteristics in a database.

31. The method of claim 18, wherein said step (e) includes retrieving said previously collected said filtered light intensities from a database.

32. The method of claim 18, further comprising:
(f) communicating a warning when comparison in said step (e) indicates that at least one said filtered light characteristic and its respective said previously collected said filtered light characteristic exceeds a pre-set limit.

* * * * *